United States Patent [19]

Takahashi

[11] 4,038,203
[45] July 26, 1977

[54] CERTAIN ALKALI METAL-RARE EARTH METAPHOSPHATE PHOTOLUMINESCENT GLASSES

[75] Inventor: Tatsuo Takahashi, Isehara, Japan

[73] Assignee: RCA Corporation, New York, N.Y.

[21] Appl. No.: 688,671

[22] Filed: May 21, 1976

[51] Int. Cl.$^2$ .................. C09K 11/46; C03C 3/16
[52] U.S. Cl. .................... 252/301.4 P; 106/47 R
[58] Field of Search ............... 252/301.4 P; 106/47 R

[56] References Cited

U.S. PATENT DOCUMENTS

| | | | |
|---|---|---|---|
| 3,549,554 | 12/1970 | Hirayama et al. | 252/301.4 P X |
| 3,580,859 | 5/1971 | Buzhinsky et al. | 252/301.4 P X |
| 3,740,241 | 6/1973 | Bromer et al. | 252/301.4 P X |
| 3,785,834 | 1/1974 | Rapp | 106/47 R X |
| 3,853,568 | 12/1974 | Chvatal | 106/47 R |
| 3,863,177 | 1/1975 | Damen et al. | 252/301.4 P X |

Primary Examiner—Jack Cooper
Attorney, Agent, or Firm—Glenn H. Bruestle; H. Christoffersen; Birgit E. Morris

[57] ABSTRACT

High intensity photoluminescent glasses comprising certain alkali metal-rare earth metaphosphates are suitable for use in display panels, indicator lights, and decorative illumination, etc. These glasses, with a suitable activator, have the formula:

$$[n\{(1-x)M_2O \cdot 2xQ \cdot P_2O_5\}][(1-y)Y_2O_3 \cdot yR_2O_3 \cdot 3P_2O_5]$$

where $n$ is from two to siz, $x$ is from 0 to 0.2 and $y$ is from 0 to 1; M is an alkali metal; $Q$ is a thallium or silver activator and R is at least one of europium and terbium.

8 Claims, No Drawings

CERTAIN ALKALI METAL-RARE EARTH METAPHOSPHATE PHOTOLUMINESCENT GLASSES

BACKGROUND OF THE INVENTION

U.S. Pat. Nos. 3,506,587 and 3,522,190 to Turner et al and U.S. Pat. No. 3,642,651 to Marboe et al describe photoluminescent glasses. In greater detail, Turner et al, U.S. Pat. No. 3,506,587, describe high intensity photoluminescent glasses comprising aluminosilicates and aluminoborosilicates containing alkaline earth metal oxides, but being substantially free of alkali metal oxides, and containing an effective amount of a luminescent activator to convert incident ultraviolet into usable visible illumination. The luminescent activator consists of at least two members of the group of tin oxide, copper oxide and samarium oxide.

Turner et al, U.S. Pat. No. 3,522,190, disclose photoluminescent glass compositions, particularly magnesia-alumina-silica glasses, doped with samarium partially reduced to the divalent state.

Marboe et al disclose photoluminescent glasses of borate, phosphate, or silicate containing a germanium compound, such as germanium dioxide, as an activator.

Materials which exhibit fluorescence in response to ultraviolet light are becoming increasingly significant in many practical applications, such as increasing the output of mercury vapor lamps and use in display panels, indicator lamps, decorative illumination, etc. Accordingly, additional photoluminescent glasses are constantly being sought. The present invention provides certain such materials.

SUMMARY OF THE INVENTION

A photoluminescent glass having the composition:

$$[n\{(1-x)M_2O\cdot2\times Q\cdot P_2O_5\}][(1-y)Y_2O_3\cdot yR_2O_3\cdot 3P_2O_5]$$

wherein $n$ is from two to six, $x$ is from 0 to 0.2 and $y$ is from 0 to 1; $M$ is an alkali metal; $Q$ is a thallium or silver activator and $R$ is an europium or terbium activator, emits visible light when illuminated by an ordinary ultraviolet (UV) source. The glasses of the present invention give emissions in various colors.

DETAILED DESCRIPTION

The present invention provides novel photoluminescent glass compositions, which are suitable for a wide variety of applications. The glasses are excited by a conventional ultraviolet (UV) light source, such as a mercury discharge lamp or a black light fluorescent lamp. By suitably doping a glass of the formula:

$$[n(M_2O\cdot P_2O_5)][Y_2O_3\cdot 3P_2O_5]$$

wherein $M$ is an alkali metal and $n$ is from 0 to 6, one can obtain compositions which give emissions in a wide variety of colors, when struck by ultraviolet light.

The glasses of the present invention may be made by mixing appropriate amounts of anhydrous dibasic alkali metal phosphate or carbonate, yttrium oxide, anhydrous dibasic ammonium phosphate and a suitable activator in a ball mill. The alkali metal ion is preferably lithium, sodium or potassium. The mixture is then placed into a high temperature alumina or platinum crucible and slowly heated at a rate of 30° to 50° C. per hour to a temperature of 50° to 100° above the glass forming temperature. At the high temperature used in melting the glass, ammonia and/or carbon dioxide volatilizes from the melt. The melt is kept at this temperature for a period of about 2 to 3 hours, is then poured into a graphite die of desired shape, and is annealed in an electric furnace, kept at a suitable temperature, for at least 8 hours. Approximate glass forming and annealing temperatures for a representative glass of the above compositions, i.e. wherein about half of the yttrium oxide is replaced by an europium oxide activator, are found in Table 1.

TABLE 1

| $M_2O$ | Glass Forming Temperature, (° C) | Annealing Temperature, (° C) |
|---|---|---|
| $Li_2O$ | >1000 | 300° ~ 350° |
| $Na_2O$ | 700° ~ 800° | 200° ~ 250° |
| $K_2O$ | 600° ~ 700° | 150° ~ 200° |

The glass forming temperature increases, for glasses containing the same alkali metal oxide, as the yttrium oxide content increases.

The doped glasses of the present invention can produce many different colors when excited or activated by ultraviolet light. Suitable selection of the activators will determine the color produced by the various glasses. Mixtures of activators can also be employed.

Examples of green emitting glasses are shown in Table 2 below. In this Table, and in Tables 3 and 4 below, the quantities are on a weight percent basis. These glasses have the formula:

$$[n(M_2O\cdot P_2O_5)]\cdot[(1-y)Y_2O_3\cdot yTb_2O_3\cdot 3P_2O_5]$$

where $y$ is from 0 to 1 and $M$ and $n$ have the meanings given above. These terbium$^{+3}$ activated glasses exhibit the strongest emission of any of the glasses of the present invention. Their intensities are visually comparable to those of the well known green phosphors $$CdO\cdot 2B_2O_3:Mn$$

or $$ZnO\cdot B_2O_3:Mn$$

but are weaker than $$Zn_2SiO_4:Mn$$

under a 254 nm UV irradiation source.

TABLE 2

| Sample | 1 | 2 | 3 | 4 | 5 |
|---|---|---|---|---|---|
| $Li_2O$ | 10.2 | — | — | — | — |
| $Na_2O$ | — | 18.4 | 19.1 | — | — |
| $K_2O$ | — | — | — | 15.8 | 22.6 |
| $Y_2O_3$ | 6.4 | — | 5.8 | 9.5 | 6.8 |
| $Tb_2O_3$ | 10.5 | 18.2 | 9.4 | 15.3 | 11.0 |
| $P_2O_5$ | 72.9 | 63.4 | 65.7 | 59.4 | 59.6 |
| | 100.0 | 100.0 | 100.0 | 100.0 | 100.0 |

Illustrative of the emission spectra of the various glasses is the spectrum of the glass of Sample 3, which shows peaks at the following wavelengths (nm) with the relative intensities in parenthesis (absolute units): 487 nm (25); 543 nm (100); 549 nm (80); 583 nm (7.5); 589 nm (6) and 521 nm (3). The emission spectra of terbium activated glasses remained unchanged regardless of the UV wavelength used for excitation.

Europium activated glasses of the formula:

$$[n(M_2O \cdot P_2O_5)] \cdot [(1-y)Y_2O_3 \cdot yEu_2O_3 \cdot 3P_2O_5]$$

wherein $y$ is from 0 to 1, are red emitting glasses when excited. Illustrative glasses are those given in Table 3.

TABLE 3

| Sample | 6 | 7 | 8 | 9 | 10 |
|---|---|---|---|---|---|
| Li$_2$O | 10.3 | — | — | — | — |
| Na$_2$O | — | 16.2 | 19.2 | — | — |
| K$_2$O | — | — | — | 15.9 | 22.7 |
| Y$_2$O$_3$ | 6.5 | 7.4 | 5.8 | 9.5 | 6.8 |
| Eu$_2$O$_3$ | 10.1 | 11.5 | 9.1 | 14.8 | 10.6 |
| P$_2$O$_5$ | 73.1 | 64.9 | 65.9 | 59.8 | 59.9 |
| | 100.0 | 100.0 | 100.0 | 100.0 | 100.0 |

The emission spectrum for the glass of Sample 8, shows peaks at the following wavelengths with the relative intensity in absolute units: 591 nm (32); 614 nm (100); 654 nm (4); and 701 nm (19). These Eu$^{+3}$ activated red emitting glasses show a strong absorption near 400 nm and two small absorptions at 460 nm and 530 nm. As a result these glasses have a slight pinkish tint.

The blue emitting glasses are activated by a thallium or silver compound. AgCl, Ag$_2$O or AgNO$_3$ may be used as a silver source without any appreciable change in luminescent properties. Both the Tl$^+$ and Ag$^+$ activated glasses have a wide band emission having the peak in the long UV range. Examples of Tl$^+$ and Ag$^+$ glasses are seen in Table 4. Representative Tl$^+$ (No. 13) and Ag$^+$ (No. 14) activated glasses have their respective peaks at 350 and 375 nm.

TABLE 4

| Sample | 11 | 12 | 13 | 14 | 15 | 16 |
|---|---|---|---|---|---|---|
| Li$_2$O | 9.0 | — | — | — | — | — |
| Na$_2$O | — | 17.7 | 15.5 | 19.2 | 16.6 | — |
| K$_2$O | — | — | — | — | — | 15.8 |
| TlCl | 10.3 | 7.2 | 10.6 | — | — | 20.1 |
| AgCl | — | — | — | 1.8 | 8.6 | — |
| Y$_2$O$_3$ | 12.1 | 11.2 | 11.1 | 11.8 | 11.2 | 11.9 |
| P$_2$O$_3$ | 68.6 | 63.9 | 62.8 | 67.2 | 63.6 | 52.2 |
| | 100.0 | 100.0 | 100.0 | 100.0 | 100.0 | 100.0 |

The thallium activated glass is excited by a 250 nm UV light but not by a 360 nm UV light. Quenching is desirable when casting the silver activated glass because slow cooling of the glass to the annealing temperature may result in a precipitation of colloidal silver particles.

Glasses with a yellow to orange luminescence can be produced by mixing both europium and terbium in the same glass, that is a glass having a composition of the formula:

$$[nM_2O \cdot P_2O_5][(1-y_1)Y_2O_3 \cdot y_1Tb_2O_3 \cdot 3P_2O_5][(1-y_2)Y_2O_3 \cdot y_2Eu_2O_3 \cdot 3P_2O_5].$$

For example a glass wherein $y_1$ is 0.3 and $y_2$ is 0.2 ($y_1:y_2::3:2$) will produce a yellow color and a glass wherein $y_1$ is 0.25 and $y_2$ is 0.25 ($y_1:y_2::1:1$) will produce an orange color. To produce a yellow color, the ratio of $y_1$ to $y_2$ should be equal or greater than 1.3 but less than or equal 1.5 ($1.5 \geq y_1/y_2 \geq 1.3$) while to produce an orange color the ratio, $y_1/y_2$, should be equal or greater than 0.8 but less than or equal 1.0 ($1.0 \geq y_1/y_2 \geq 0.8$). Variations between these colors can readily be obtained by changing the proportions of $y_1$ and $y_2$, that is by changing the mole ratio of Tb$^{+3}$ to Eu$^{+3}$.

For example, a blue photoluminescent glass has the typical composition:

$$[n\{(1-x)M_2O \cdot 2 \times AgCl \cdot P_2O_5\}][Y_2O_3 \cdot 3P_2O_5]$$

wherein $x$ is from 0.01 to 0.05.

Varying the proportions of the activator within the enumerated ranges for $x$ and $y$ has the effect that increasing the amount of the activator results in increasing the intensity of the emitted light. If the amount of silver activator exceeds 0.05 then homogeneous glass formation become difficult. On the other hand, if the amount of silver activator is less than 0.01 then the intensity of the emitted light is too weak. Using thallium as the activator, if one exceeds 0.20 then again honogeneous glass formation becomes difficult. The glasses hereof have a refractive index of about 1.5. Other modifications will be obvious to those skilled in the art. For example, one can substitute gadolinium oxide or other of the rare earth oxides for at least part of the yttrium oxide.

I claim:

1. A photoluminescent glass having the composition:

$$[n\{(1-x)M_2O \cdot 2 \times Q \cdot P_2O_5\}][(1-y)Y_2O_3 \cdot yR_2O_3 \cdot 3P_2O_5]$$

wherein $n$ is from 2 to 6; $x$ is from 0 to 0.2 and $y$ is from 0 to 1; and

M is an alkali metal,

Q is a thallium or silver activator selected from the group consisting of chlorides, oxides and nitrates of thallium and silver, R is at least one of the group consisting of europium and terbium; and wherein Q or R are present in said composition in amounts effective to achieve photoluminescence when said glass is subjected to excitation by ultraviolet light.

2. A glass of claim 1, which is a green photoluminescent glass, having the composition:

$$[n(M_2O \cdot P_2O_5)] \cdot [(1-y)Y_2O_3 \cdot yTb_2O_3 \cdot 3P_2O_5]$$

3. A glass of claim 1, which is a red photoluminescent glass, having the composition:

$$[n(M_2O \cdot P_2O_5)] \cdot [(1-y)Y_2O_3 \cdot yEu_2O_3 \cdot 3P_2O_5]$$

4. A glass of claim 1, which is a blue photoluminescent glass, having the composition:

$$[n\{(1-x)M_2O \cdot 2 \times TlCl \cdot P_2O_5\}] \cdot [Y_2O_3 \cdot 3P_2O_5]$$

5. A glass of claim 1, which is a blue photoluminescent glass, having the composition:

$$[n\{(1-x)M_2O \cdot 2 \times AgCl \cdot P_2O_5\}][Y_2O_3 \cdot 3P_2O_5]$$

wherein $x$ is from 0.01 to 0.05.

6. A glass of claim 1, wherein both europium and terbium are present.

7. The glass of claim 6, which is an orange photoluminescent glass, having the composition:

$$[nM_2O \cdot P_2O_5][(1-y_1)Y_2O_3 \cdot y_1Tb_2O_3 \cdot 3P_2O_5][(1-y_2)Y_2O_3 \cdot y_2Eu_2O_3 \cdot 3P_2O_5]$$

wherein $y_1+y_2=y$ and the ratio of $y_1$ to $y_2$ is equal to or greater than 0.8 but less than or equal to 1.0.

8. The glass of claim 6, which is a yellow photoluminescent glass having the composition:

$$[nM_2O \cdot P_2O_5][(1-y_1)Y_2O_3 \cdot y_1Tb_2O_3 \cdot 3P_2O_5][(1-y_2)Y_2O_3 \cdot y_2Eu_2O_3 \cdot 3P_2O_5]$$

wherein $y_1+y_2=y$ and the ratio of $y_1$ to $y_2$ is equal to or greater than 1.3 but less than or equal to 1.5.

* * * * *